Feb. 11, 1969     C. F. REBHUN ET AL     3,426,437

ECCENTRICITY DETERMINATION SYSTEM

Filed July 13, 1966

INVENTORS
Charles F. Rebhun and
Keith W. Roessing.
BY John F. Mesaros
THEIR ATTORNEY

United States Patent Office 3,426,437
Patented Feb. 11, 1969

3,426,437
ECCENTRICITY DETERMINATION SYSTEM
Charles F. Rebhun, Natrona Heights, and Keith W. Roessing, Pittsburgh, Pa., assignors to Allegheny Ludlum Steel Corporation, Brackenridge, Pa., a corporation of Pennsylvania
Filed July 13, 1966, Ser. No. 564,776
U.S. Cl. 33—174     3 Claims
Int. Cl. G01b 3/00

ABSTRACT OF THE DISCLOSURE

An apparatus and method for determining the percent eccentricity of a conduit at any point along its entire length. Sensing devices are used to measure the wall thickness of a conduit at four points around a particular point. The measured values are then introduced into a computing device programmed to determine the approximate percent eccentricity of the circuit.

---

In the manufacture of tubular products it is difficult to maintain a uniform wall thickness, and it is desirable to know within what limits the wall thickness varies around the circumference of the tube. Preferably, it should be known over the entire length of the tube, and a method for determining it should be such that a continuous measurement is possible.

Accordingly, it is an object of this invention to provide a new and improved eccentricity determination system.

It is a further object of this invention to provide a new and improved method for determining the eccentricity of tubular objects.

It is another object of this invention to provide a new and improved method for determining the eccentricity of a tubular product as a percentage of the average wall thickness.

It is a still further object of this invention to provide a new and improved method and system for determining the eccentricity of a tubular product throughout the entire length thereof on a continuous basis.

The foregoing objects are accomplished in the present invention by providing a first pair of thickness sensing means diametrically opposed adjacent the tube, the wall thickness of which is desired to be measured. Each of this pair of sensing devices measures the wall thickness at the particular location thereof. A second pair of thickness sensing devices is disposed 90° from the first pair of sensing devices and located on a diameter of the tubular product. This results in third and fourth thickness measurements. The four thickness measurements thus obtained are sequentially or simultaneously fed into a computing device which is programmed to solve the equation:

$$D = \sqrt{\left[\frac{t_1 - t_3}{t_1 + t_3}\right]^2 + \left[\frac{t_2 - t_4}{t_2 + t_4}\right]^2}$$

where D is the eccentricity as a percentage of the desired or nominal tube wall thickness, and $t_1$, $t_2$, $t_3$ and $t_4$ are the four thickness measurements, when $t_1$ and $t_3$ are measured 180° apart and $t_2$ and $t_4$ are measured 180° apart, with the $t_1$, $t_3$ combination being disposed 90° from the $t_2$, $t_4$ combination.

Figure 1:
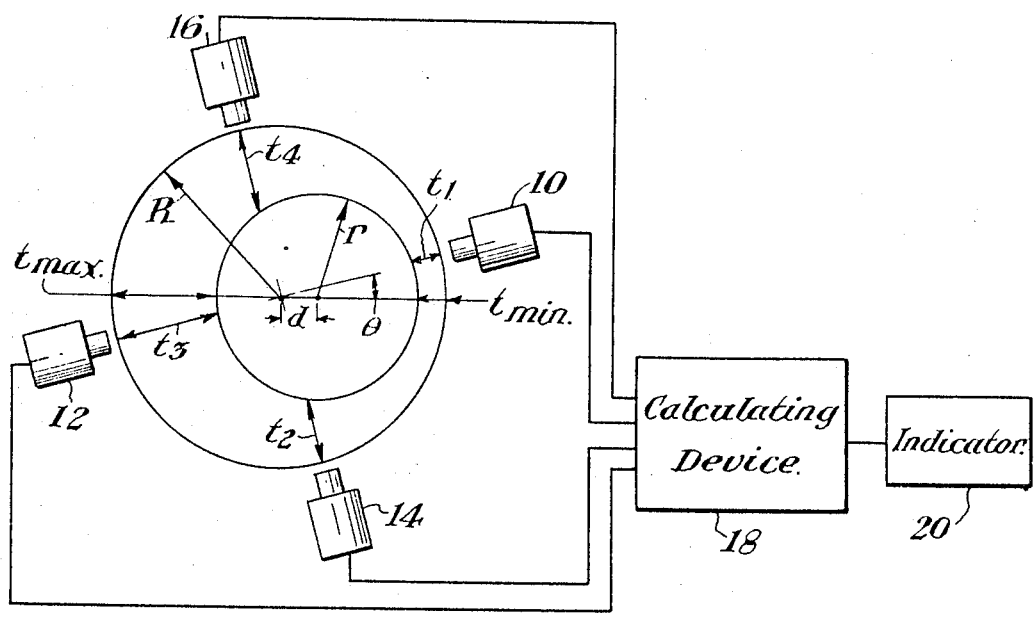
Figure 2:
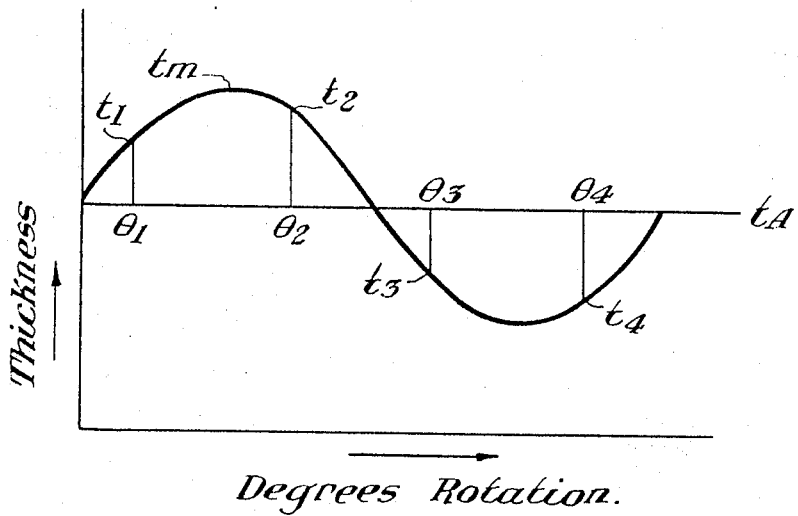

Further objects, features and advantages of this invention will become apparent from the following description when taken in conjunction with the accompanying drawings in which:

FIGURE 1 shows an exaggerated cross section of an eccentric tubular product;

FIG. 2 shows graphically an approximation of the relationship in an eccentric tube of the thickness to the angular point of measurement; and Referring now to the drawings, there is shown in FIG. 1 a cross section of a tubular product in exaggerated form showing the inner wall surface as being substantially circular in form and the outer wall surface being substantially circular in form with the center of the inner wall surface being displaced from the center of the outer wall surface by distance $d$. The inner opening has a minor radius $r$, and the outer surface has a major radius $R$.

The method normally used to express eccentricity, or wall runout, in a tube is a quantity called "Total Indicator Reading" or TIR, which is twice the distance $d$ between the center of the outer surface of the tube and the center of the inner surface of the tube. TIR may be mathematically shown to be the difference between the maximum wall thickness ($t_{max.}$) and the minimum wall thickness ($t_{min.}$) at a section as follows:

From FIG. 1:

$$t_A = d + t_{min.}$$
$$t_A = t_{max.} - d$$

where $t_A$ is the average wall thickness, or the wall thickness obtained when the tube is concentric.

Therefore:

$$d + t_{min.} = t_{max.} - d$$
$$TIR = 2d = t_{max.} - t_{min.}$$

Commercial tolerance, however, specifies that the eccentricity be limited to some percentage of the average wall thickness $t_A$. If the TIR is used for measurement the limiting percent eccentricity is doubled. With existing equipment, it is virtually impossible to measure the eccentricity directly in the terms required by commercial tolerances, and it has heretofore not been possible to make any measurement of eccentricity on a fast, continuous and automatic or semi-automatic basis. It is therefore necessary to compute the eccentricity on the basis of other measurable quantities. One measurable quantity which can be readily ascertained is the thickness of the wall of the tube measured at various points about the periphery of the tube.

In FIG. 1 a major diameter is taken through the center of the outer wall surface, and a pair of sensing devices 10 and 12 are diametrically opposed to give measurements of wall thickness at the specific locations of the sensing devices, these thickness measurements being designated as $t_1$ and $t_3$, respectively. Displaced by 90° from the first major diameter is a second major diameter also passing through the center of the outer wall surface. A sensing device 14 is disposed adjacent the wall portion at one end thereof, and another sensing device 16 is disposed adjacent the tube wall at the other end of the major diameter to give wall thickness measurements $t_2$ and $t_4$, respectively. It is to be understood that measurements taken along major diameters only give realistic wall thickness measurements at particular points. However, deviation from these major diameters can be utilized while affecting only the accuracy of the system. The thickness measurements can be taken at any points around the tube, the only requirement being that the thickness measurements be displaced by 90°.

The thickness of the wall at any point around the circumference can be shown to be a function of the major radius $R$, the minor radius $r$, the distance between the two centers $d$ and the angle designated θ between the major diameter through the thickest portion of the wall and the closest major diameter utilized for measurement of the wall thickness which, in the case shown in FIG. 1, would be the diameter utilized to measure $t_1$ and $t_3$. This functional relationship is given by:

$$t = R + [d \cos \theta - \sqrt{r^2 - d^2 \sin^2 \theta}]$$

(Equation 1)

Solution for the distance $d$ would be difficult at best from the functional relationship of this equation, but is further complicated by the inability to determine the exact angle $\Theta$. It can be shown that this equation is approximated by a sine function, and consequently measurement of four thicknesses 90° apart on the tube can be used to establish the percent deviation of the tube wall from a nominal thickness which is, by definition, percent eccentricity D.

FIG. 2 shows graphically the relationship between the thickness $t$ and the angle $\Theta$, representing the thickness of an eccentric tube about its periphery, with the assumed sine wave relationship about the nominal or average wall thickness $t_A$. The maximum wall thickness is designated $t_m$, and the points of measurement for $t_1$, $t_2$, $t_3$ and $t_4$ are designated by the angles $\Theta_1$, $\Theta_2$, $\Theta_3$ and $\Theta_4$, respectively, each angle being displaced 90° from the preceding angle.

The thickness relationships that exist from FIG. 2 are:

$$t_1 - t_A = (t_m - t_A) \sin \Theta_1$$
$$t_2 - t_A = (t_m - t_A) \sin \Theta_2 \quad (1)$$

but since $\Theta_2 = \Theta_1 + 90°$, then:

$$t_2 - t_A = (t_m - t_A) \cos \Theta_1 \quad (2)$$

From (1):

$$t_1 - t_A = t_m \sin \Theta_1 - t_A \sin \Theta_1$$
$$t_m \sin \Theta_1 = t_1 - t_A + t_A \sin \Theta_1$$
$$t_m = \frac{t_1}{\sin \Theta_1} - \frac{t_A}{\sin \Theta_1} + t_A$$
$$t_m - t_A = \frac{t_1}{\sin \Theta_1} - \frac{t_A}{\sin \Theta_1}$$

By definition, the percent deviation $$D = \frac{t_m - t_A}{t_A} = \frac{t_1}{t_A \sin \Theta_1} - \frac{1}{\sin \Theta_1}$$

$$D = \left[\frac{t_1}{t_A} - 1\right]\left[\frac{1}{\sin \Theta_1}\right]$$

$$D = \left[\frac{t_1 - t_A}{t_A}\right]\left[\frac{1}{\sin \Theta_1}\right] \quad (3)$$

Similarly, from (2):

$$D = \left[\frac{t_2 - t_A}{t_A}\right]\left[\frac{1}{\cos \Theta_1}\right] \quad (4)$$

$$\frac{\sin \Theta_1}{\cos \Theta_1} = \tan \Theta_1 = \left[\frac{t_1 - t_A}{t_A}\right]\left[\frac{t_A}{t_2 - t_A}\right] = \frac{t_1 - t_A}{t_2 - t_A}$$

$$\sin \Theta_1 = \frac{t_1 - t_A}{\sqrt{(t_1 - t_A)^2 + (t_2 - t_A)^2}} \quad (5)$$

Substituting (5) in (3):

$$D = \left[\frac{t_1 - t_A}{t_A}\right] \frac{\sqrt{(t_1 - t_A)^2 + (t_2 - t_A)^2}}{t_1 - t_A}$$

$$D = \sqrt{\left[\frac{t_1 - t_A}{t_A}\right]^2 + \left[\frac{t_2 - t_A}{t_A}\right]^2}$$

Letting $$t_A = \frac{t_1 + t_3}{2} \text{ and } \frac{t_2 + t_4}{2}$$

The following relationship results:

$$D = \sqrt{\left[\frac{t_1 - t_3}{t_1 + t_3}\right]^2 + \left[\frac{t_2 - t_4}{t_2 + t_4}\right]^2} \quad \text{(Equation 2)}$$

in which D is percent eccentricity and $t_1$, $t_2$, $t_3$ and $t_4$ are thickness measurements made on major diameters and spaced 90° apart.

One method of validating the assumed relationship of Equation 2 is to make direct physical measurements on a large number of tube cross sectional samples. Another method of validating the assumption, and the method used herein, is to simulate tube wall sections by means of a computing device, generate the appropriate dimensional measurements and solve for the approximated percent eccentricity in accordance with Equation 1, tube wall sections being defined in terms of the initial major and minor radii and a specific eccentricity placed in the original model. These relationships were then evaluated by Equation 2 in order to determine the conceptual error between the actual relationship of Equation 1 and the approximated relationship of Equation 2.

Table 1 shows the maximum conceptual error resulting from the approximated equation generated from the graph of FIG. 2 for given percent eccentricities and various tube sizes. The last column illustrates the percent error between the approximation of Equation 2 and the true simulated eccentricity.

TABLE 1

| Nominal O.D. | Nominal wall | Major radius | Minor radius | Eccentricity Inch | Eccentricity Percent | Max. conceptual error (percent) |
|---|---|---|---|---|---|---|
| 0.500 | 0.1250 | 0.2500 | 0.1250 | 0.00125 | 1.0 | −0.000 |
| 0.500 | 0.1250 | 0.2500 | 0.1250 | 0.00250 | 2.0 | −0.001 |
| 0.500 | 0.1250 | 0.2500 | 0.125 | 0.00625 | 5 | −0.004 |
| 0.500 | 0.1250 | 0.2500 | 0.125 | 0.01250 | 10 | −0.026 |
| 0.500 | 0.1250 | 0.2500 | 0.125 | 0.01875 | 15 | −0.085 |
| 0.500 | 0.1250 | 0.2500 | 0.125 | 0.02500 | 20 | −0.194 |
| 0.500 | 0.1875 | 0.2500 | 0.0625 | 0.001825 | 0.973 | −0.000 |
| 0.500 | 0.1875 | 0.2500 | 0.0625 | 0.003650 | 1.946 | −0.001 |
| 0.500 | 0.1875 | 0.2500 | 0.0625 | 0.00938 | 5 | −0.009 |
| 0.500 | 0.1875 | 0.2500 | 0.0625 | 0.01875 | 10 | −0.076 |
| 0.500 | 0.1875 | 0.2500 | 0.0625 | 0.02813 | 15 | −0.256 |
| 0.500 | 0.1875 | 0.2500 | 0.0625 | 0.03750 | 20 | −0.610 |
| 1.500 | 0.1350 | 0.7500 | 0.6150 | 0.00675 | 5 | −0.001 |
| 1.500 | 0.1350 | 0.7500 | 0.6150 | 0.01350 | 10 | −0.007 |
| 1.500 | 0.1350 | 0.7500 | 0.6150 | 0.02025 | 15 | −0.020 |
| 1.500 | 0.1350 | 0.7500 | 0.6150 | 0.02700 | 20 | −0.046 |
| 2.000 | 0.1350 | 1.0000 | 0.8650 | 0.00675 | 5 | −0.001 |
| 2.000 | 0.1350 | 1.0000 | 0.8650 | 0.01350 | 10 | −0.005 |
| 2.000 | 0.1350 | 1.0000 | 0.8650 | 0.02025 | 15 | −0.015 |
| 2.000 | 0.1350 | 1.0000 | 0.8650 | 0.02700 | 20 | −0.033 |
| 2.000 | 0.1560 | 1.0000 | 0.8440 | 0.0078 | 5 | −0.001 |
| 2.000 | 0.1560 | 1.0000 | 0.8440 | 0.0156 | 10 | −0.006 |
| 2.000 | 0.1560 | 1.0000 | 0.8440 | 0.0234 | 15 | −0.037 |
| 2.000 | 0.1560 | 1.0000 | 0.8440 | 0.0312 | 20 | −0.039 |
| 2.000 | 0.1870 | 1.0000 | 0.8130 | 0.00935 | 5 | −0.001 |
| 2.000 | 0.1870 | 1.0000 | 0.8130 | 0.01870 | 10 | −0.007 |
| 2.000 | 0.1870 | 1.0000 | 0.8130 | 0.02805 | 15 | −0.020 |
| 2.000 | 0.1870 | 1.0000 | 0.8130 | 0.03740 | 20 | −0.048 |
| 2.000 | 0.3750 | 1.0000 | 0.6250 | 0.01875 | 5 | −0.003 |
| 2.000 | 0.3750 | 1.0000 | 0.6250 | 0.03750 | 10 | −0.016 |
| 2.000 | 0.3750 | 1.0000 | 0.6250 | 0.05625 | 15 | −0.052 |
| 2.000 | 0.3750 | 1.0000 | 0.6250 | 0.07500 | 20 | −0.121 |
| 2.500 | 0.2500 | 1.2500 | 1.0000 | 0.0125 | 5 | −0.001 |
| 2.500 | 0.2500 | 1.2500 | 1.0000 | 0.0250 | 10 | −0.007 |
| 2.500 | 0.2500 | 1.2500 | 1.0000 | 0.0375 | 15 | −0.023 |
| 2.500 | 0.2500 | 1.2500 | 1.0000 | 0.500 | 20 | −0.052 |
| 8.000 | 0.5000 | 4.0000 | 3.5000 | 0.02500 | 5 | −0.001 |
| 8.000 | 0.5000 | 4.0000 | 3.5000 | 0.05000 | 10 | −0.005 |
| 8.000 | 0.5000 | 4.0000 | 3.5000 | 0.07500 | 15 | −0.014 |
| 8.000 | 0.5000 | 4.0000 | 3.5000 | 0.10000 | 20 | −0.031 |
| 8.000 | 0.2500 | 4.0000 | 3.7500 | 0.01250 | 5 | −0.001 |
| 8.000 | 0.2500 | 4.0000 | 3.7500 | 0.02500 | 10 | −0.003 |
| 8.000 | 0.2500 | 4.0000 | 3.7500 | 0.03750 | 15 | −0.007 |
| 8.000 | 0.2500 | 4.0000 | 3.7500 | 0.05000 | 20 | −0.015 |

As shown in the table, various size tubes were simulated for an outside diameter of ½ inch and ⅛ inch wall thickness to an 8-inch tube with ¼ inch wall thickness. Tests were run with a known eccentricity of 5, 10, 15 and 20% in all models with 1 and 2% calculations for two models of smaller size. The results, as can be seen from the last column (maximum conceptual errors, %), shows that for commercial utilization of 10% eccentricity or less, the accuracy of the approximated equation is very good, and furthermore that it is acceptable for all ranges of eccentricity tested and a wide range of tube sizes.

Therefore, by using the approximation of Equation 2, percent eccentricity of tubular products can be readily determined. By using known commercial devices which do not require approaching the thickness to be measured from both sides and appropriate spacing around the periphery of the tube, the thickness measurements $t_1$, $t_2$, $t_3$, and $t_4$ can be readily made and applied directly to a calculating device 18 which will solve Equation 2 to give the percent eccentricity D and so indicate at indicator 20. The thickness sensing devices 10, 12, 14 and 16 may be ultrasonic, X-ray, nuclear radiation measuring devices, or any other type. Depending on the nature of the measuring device, the measurements can be made either simultaneously or sequentially. If the measurements are made sequentially, a read-out signal is required to initiate the computation after all inputs are present. The computer percent eccentricity is then compared to a required percent eccentricity and an output signal will be generated when the computed eccentricity is equal to, greater than, or less than that required.

As is obvious, the system and method herein described can be utilized to continuously measure the eccentricity of a tubular product, can be used to accept or reject a particular tubular product on the basis of a required percent eccentricity, can be used to pinpoint the portion of a tubular product which is beyond the required eccentricity, or can be used to classify tubular products according to the degree of eccentricity.

While there has been shown and described one specific embodiment, it is to be understood that other modifications and adaptations can be made without departing from the spirit and scope of the invention.

We claim:

1. Apparatus for the determination of an approximation to the percent eccentricity of a tubular product having substantially circular inner and outer wall surfaces, said apparatus comprising:
    (a) first means for measuring the wall thickness $t_1$ at a first point;
    (b) second means for measuring the wall thickness $t_2$ at a second point spaced approximately 90° from said first point;
    (c) third means for measuring the wall thickness $t_3$ at a third point spaced approximately 180° from said first point;
    (d) fourth means for measuring the wall thickness $t_4$ at a fourth point spaced approximately 90° from said third point; and
    (e) calculating means responsive to said first, second, third and fourth means for determining the approximate percent eccentricity D according to the formula $$D=\sqrt{\left[\frac{t_1-t_3}{t_1+t_3}\right]^2+\left[\frac{t_2-t_4}{t_2+t_3}\right]^2}$$

2. Apparatus according to claim 1 wherein said first and third means are disposed to measure the thicknesses through the wall on a first diameter of the outer surface of the tubular product, and said second and fourth means are disposed to measure the thicknesses through the wall on a second diameter of the outer surface of said tubular product.

3. A method for determining an approximation to the present eccentricity of a tubular product having substantially circular inner and outer wall surfaces, said method comprising the steps of:
    (a) measuring the wall thickness $t_1$ at a first point;
    (b) measuring the wall thickness $t_2$ at a second point spaced approximately 90° from said first point;
    (c) measuring the wall thickness $t_3$ at a third point spaced approximately 180° from said first point;
    (d) measuring the wall thickness $t_4$ at a fourth point spaced approximately 90° from said third point; and
    (e) introducing the measured values into computing means, programmed to determine the approximate percent eccentricity D from the formula $$D=\sqrt{\left[\frac{t_1-t_3}{t_1+t_3}\right]^2+\left[\frac{t_2-t_4}{t_2+t_3}\right]^2}$$

References Cited

FOREIGN PATENTS 164,436  12/1964  U.S.S.R.

SAMUEL S. MATTHEWS, *Primary Examiner.*